(12) United States Patent
Reeser et al.

(10) Patent No.: US 10,737,883 B2
(45) Date of Patent: Aug. 11, 2020

(54) METHODS AND SYSTEMS FOR A CONVEYOR ASSEMBLY

(71) Applicant: PPM TECHNOLOGIES HOLDINGS, LLC, Newberg, OR (US)

(72) Inventors: Devin Ray Reeser, Portland, OR (US); Eric Jason Doern, Sherwood, OR (US)

(73) Assignee: PPM TECHNOLOGIES HOLDINGS, LLC, Newberg, OR (US)

( * ) Notice: Subject to any disclaimer, the term of this patent is extended or adjusted under 35 U.S.C. 154(b) by 0 days.

(21) Appl. No.: 16/269,420

(22) Filed: Feb. 6, 2019

(65) Prior Publication Data

US 2019/0241369 A1    Aug. 8, 2019

Related U.S. Application Data

(60) Provisional application No. 62/627,136, filed on Feb. 6, 2018.

(51) Int. Cl.
*B65G 23/18* (2006.01)

(52) U.S. Cl.
CPC .................... *B65G 23/18* (2013.01)

(58) Field of Classification Search
CPC .............. B07B 1/005; B07B 1/4645
USPC ............ 198/377.05, 472.1, 752.1, 759, 803, 198/803.6, 805
See application file for complete search history.

(56) References Cited

U.S. PATENT DOCUMENTS

| | | | |
|---|---|---|---|
| 2,721,474 A * | 10/1955 | Phelps | G01M 1/22 73/466 |
| 5,579,897 A | 12/1996 | Kasik | |
| 7,114,614 B2 | 10/2006 | Hamilton et al. | |
| 8,550,235 B2 | 10/2013 | Suderman | |
| 2003/0205028 A1* | 11/2003 | Sus | A47J 37/1228 53/440 |
| 2008/0110725 A1 | 5/2008 | Allore | |
| 2011/0139588 A1* | 6/2011 | Petri | B65G 27/34 198/771 |

* cited by examiner

*Primary Examiner* — Gene O Crawford
*Assistant Examiner* — Lester Rushin, III
(74) *Attorney, Agent, or Firm* — McCoy Russell LLP (57) ABSTRACT

Methods and systems are provided for a conveyor system. In one example, a system may include a drive carriage comprising a plurality of magnets configured to magnetically couple to a conveyor pan. The plurality of magnets may be configured to maintain the conveyor pan in a fully locked position as the drive carriage actuates the conveyor pan.

20 Claims, 8 Drawing Sheets

METHODS AND SYSTEMS FOR A CONVEYOR ASSEMBLY

CROSS REFERENCE TO RELATED APPLICATIONS

The present application claims priority to U.S. Provisional Application No. 62/627,136, entitled "METHODS AND SYSTEMS FOR A CONVEYOR ASSEMBLY", and filed on Feb. 6, 2018. The entire contents of the above-listed application are hereby incorporated by reference for all purposes.

FIELD

The present description relates generally to conveyors having magnetically coupled components.

BACKGROUND AND SUMMARY

Conveyors may be used in a wide variety of industries for transportation of bulk materials or small parts. Additionally, some conveyors may be used to perform processing operations such as screening, transferring, heating, cooling, and other such processing operations on bulk materials such as food products, sand, gravel, foundry parts, or the like.

The inventors have identified some shortcomings in some conveyor assemblies, particularly in conveyor assemblies which fasten one or more components together. Conveyor assemblies may comprise relatively large components, such as a conveyor pan, that may be difficult for operators to clean or replace due to the complex connection of the conveyor pan to a drive motor and/or a conveyor mount.

As one example, due to the difficulty of the conveyor pan of a conveyor, one or more tools and people may be needed to loosen and remove the conveyor pan to access components arranged below the conveyor pan, such as the drive motor and/or the conveyor mount. Therefore, if the conveyor assembly demands servicing (e.g., cleaning, repair, and/or the like), then bolts and other fasteners are loosened prior to a conveyor pan being removed, which may be time consuming and physically demanding.

However, the inventors herein have recognized potential solutions to production delays as a result of cleaning or servicing the conveyor assembly. In one example, the issues described above may be addressed by a conveyor system comprising a drive carriage comprising a plurality of magnets spaced away from a drive motor, and where the magnets apply a force to a conveyor pan in a direction perpendicular to a direction of movement of the conveyor pan. In this way, the conveyor pan is removable from the conveyor assembly without loosening bolts or the like.

As one example, the conveyor assembly may be cleaned and serviced more quickly. Additionally, the plurality of magnets may provide a more consistent and uniform locomotion of the conveyor pan. Bolts and other fasteners may degrade over time due to frictional forces, however, the magnetic field supplied by the magnets may not degrade over time, thereby providing a uniform relation between the conveyor pan and the drive motor. Additionally, decoupling of the conveyor pan from the drive carriage may be faster than loosening one or more bolts. The decoupling may occur in response to actuating a lever. As such, the magnetic force may only be overcome in response to an external force (e.g., a user actuating a lever) and not due to the conveyance of items on the conveyor pan.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
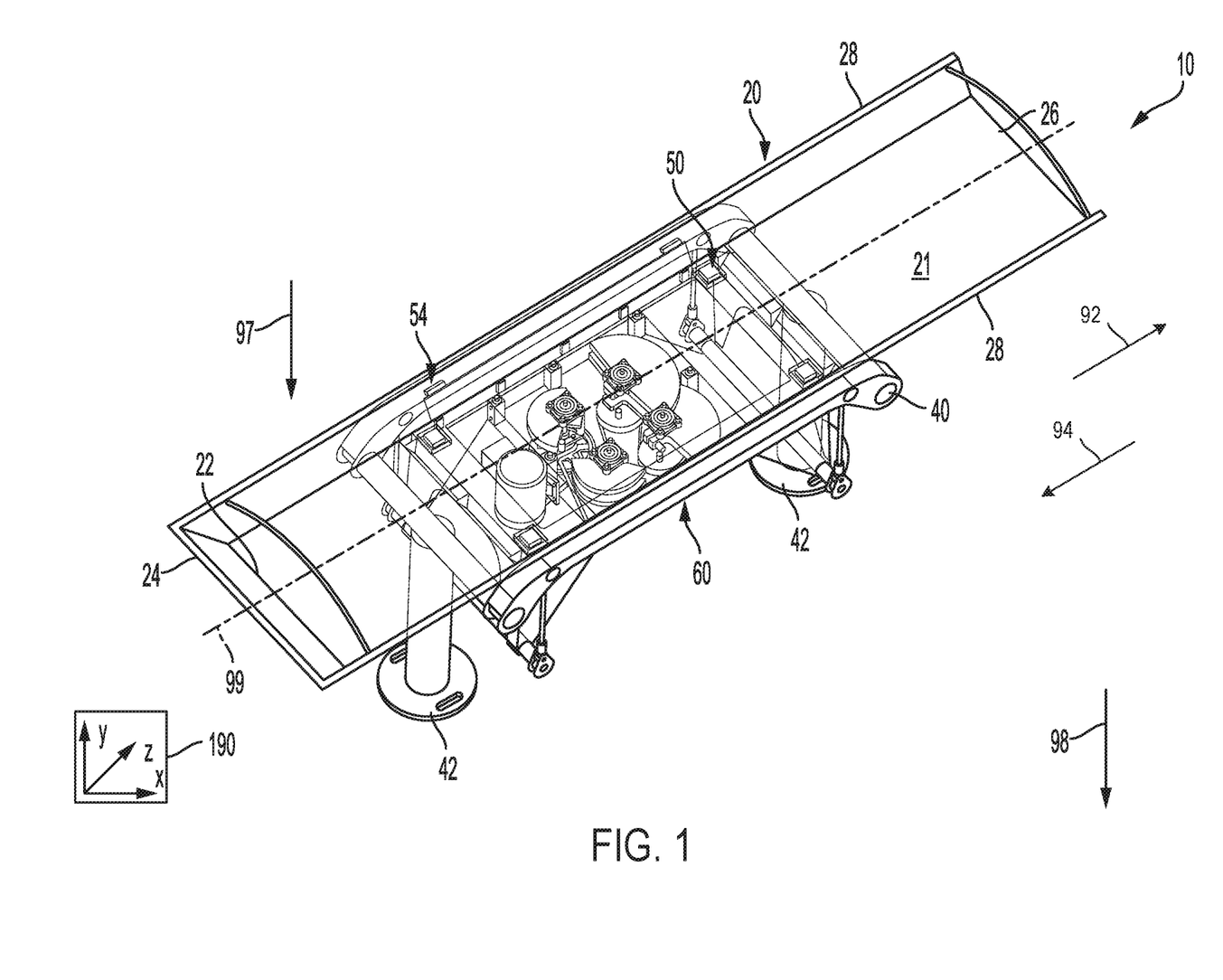
FIG. 1 shows a conveyor assembly comprising a conveyor pan, a drive carriage, and a drive motor.

The following description relates to systems and methods for a conveyor assembly having a magnetic coupling. In one example, the conveyor is a vibratory conveyor and/or a slip conveyor. The conveyor assembly may include a conveyor pan coupled to a drive carriage, as shown in FIG. 1. A drive motor may be coupled to the drive carriage, where the drive motor may be positioned to provide a motion to the conveyor pan. In some embodiments, where the conveyor assembly is a vibratory conveyor assembly, the drive motor may actuate the conveyor pan in a first direction at a first force and then in a second direction, opposite the first direction, at a second force different than the first force.

Figure 2A:
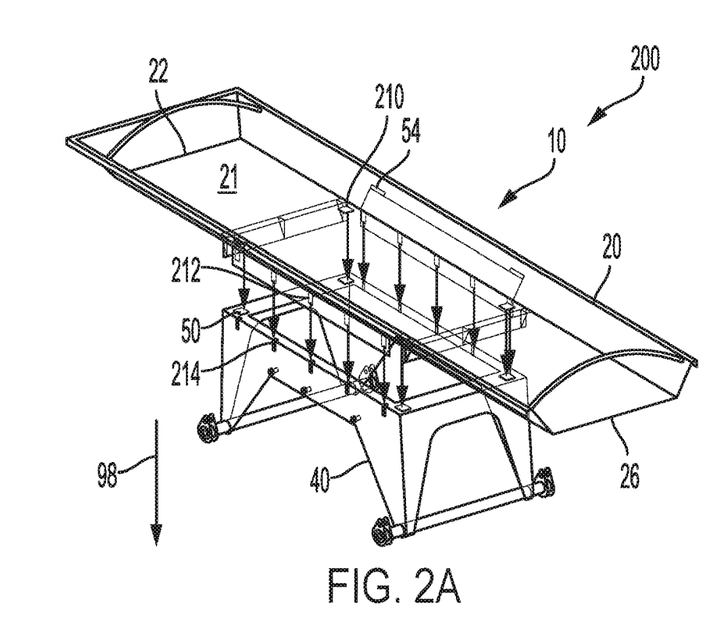
FIG. 2A shows an exploded view of the conveyor assembly comprising the conveyor pan and the drive carriage.
Figure 2B:
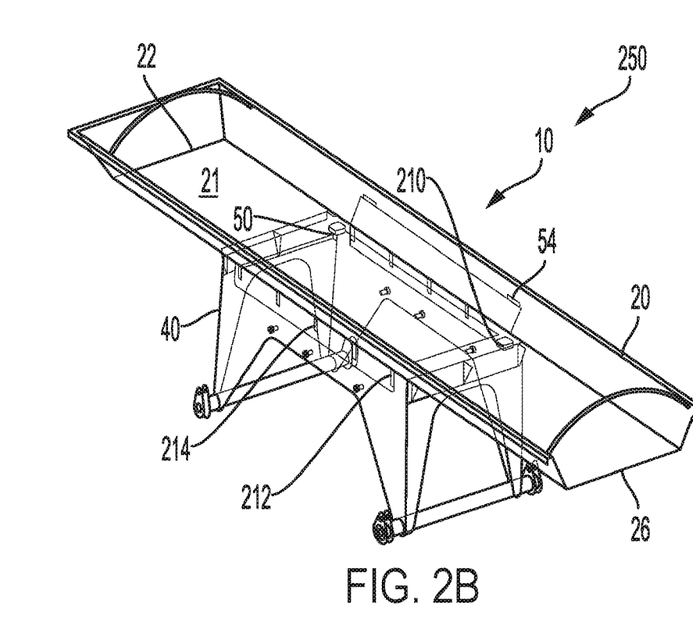
FIG. 2B shows an assembled view of the conveyor pan and the drive carriage.
Figure 3A:
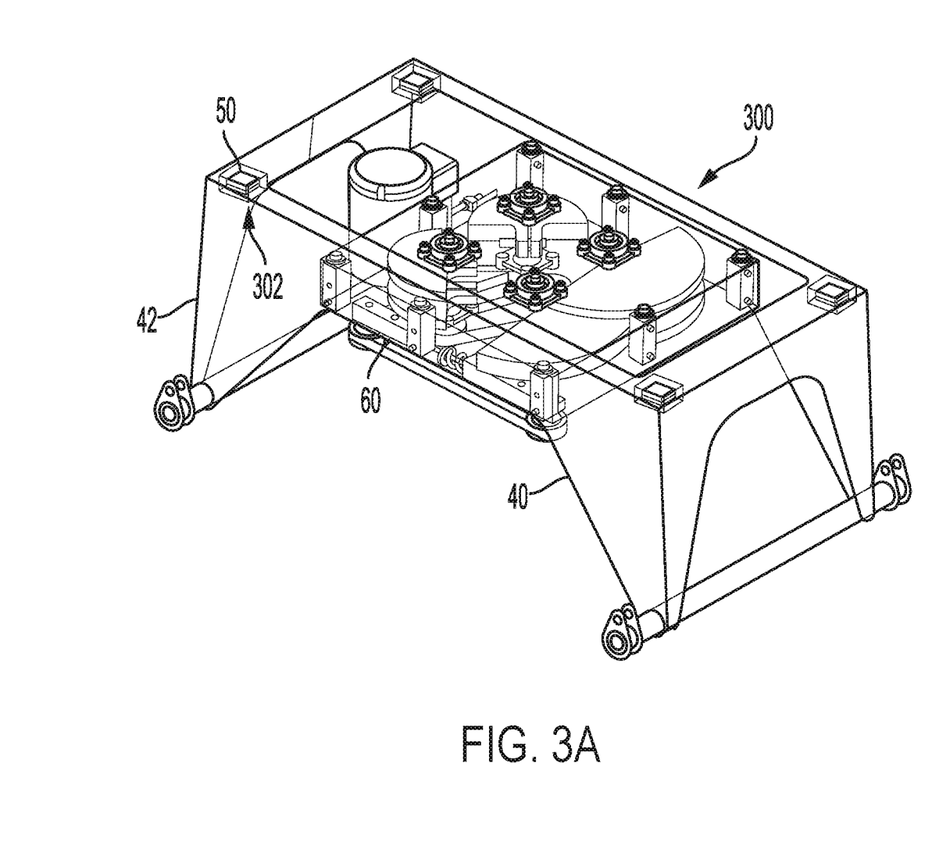
FIG. 3A shows a detailed view of the drive motor and the drive carriage.
Figure 3B:
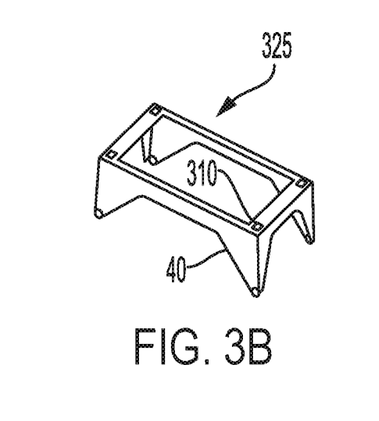
FIG. 3B shows a detailed view of cutouts of the drive carriage.
Figure 3C:
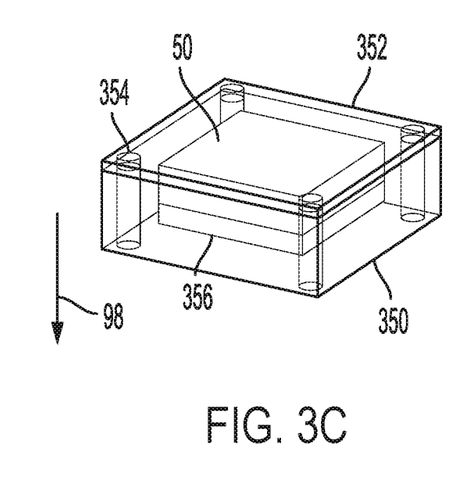
FIG. 3C shows a detailed view of a magnet housing.

FIG. 2A shows an exploded view of the conveyor pan and the drive carriage, wherein coupling points between each are illustrated. The conveyor pan may comprise constraining lugs which may be received by receiving holes arranged in the drive carriage. FIG. 2B shows a fully assembled embodiment of the conveyor pan and the drive carriage. In the fully assembled embodiment, the conveyor pan may be removed from the drive carriage in response to an external force, as will be described below. The conveyor pan may be at least partially coupled to the drive carriage by a plurality of magnets, as shown in FIG. 3A. The magnets may be arranged on corners of the drive carriage to evenly distribute the coupling force of the magnets. By doing this, a path of motion of the conveyor pan may be more uniform. FIG. 3B shows cutouts of the drive carriage, through which the magnets may magnetically couple to the conveyor pan. FIG. 3C shows a detailed view of a magnet assembly.

Figure 4A:
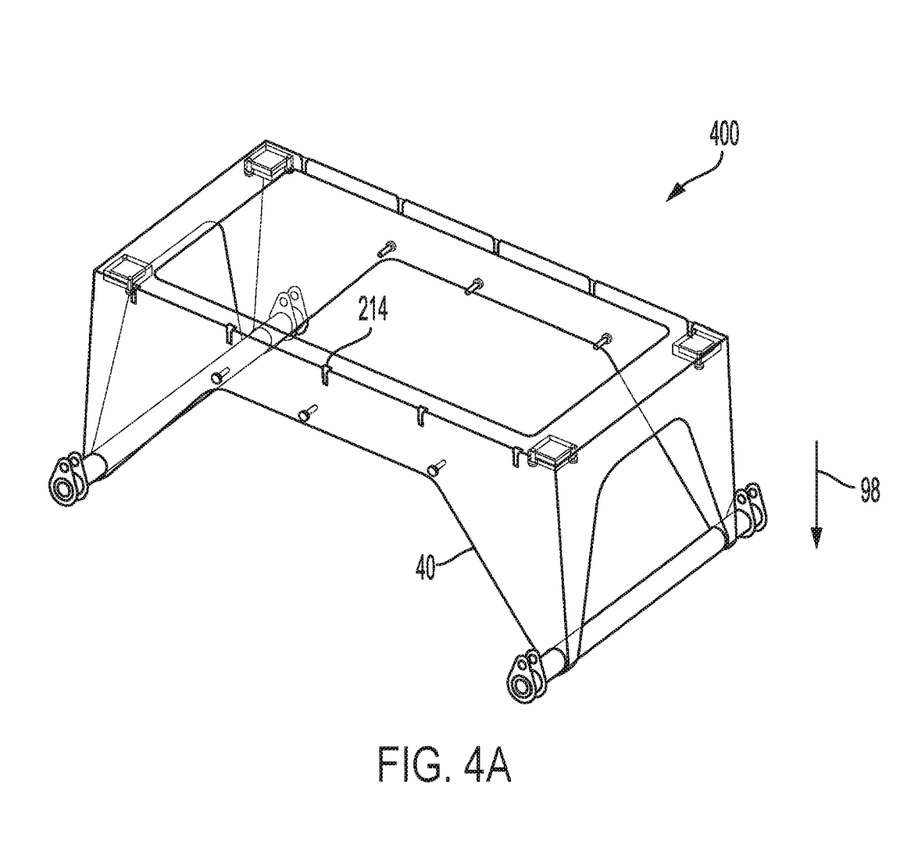
FIG. 4A shows a detailed view of the drive carriage.
Figure 4B:
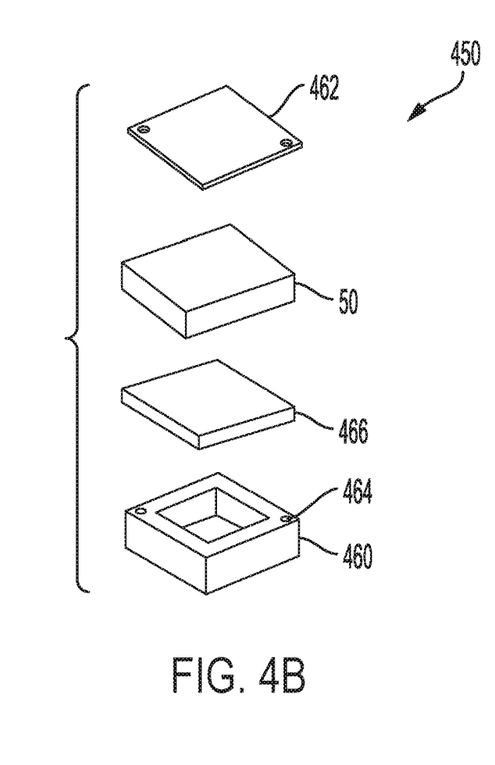
FIG. 4B shows an exploded view of the magnet housing.

The drive carriage comprises a plurality of cutouts for the magnetic couplings to magnetically couple to the conveyor pan. The cutouts with the magnetic couplings arranged therebelow are shown in FIG. 4A. The magnetic couplings may comprise a housing and a variety of components for adjusting a magnetic coupling force of the magnets, as shown in FIG. 4B.

Figure 5A:
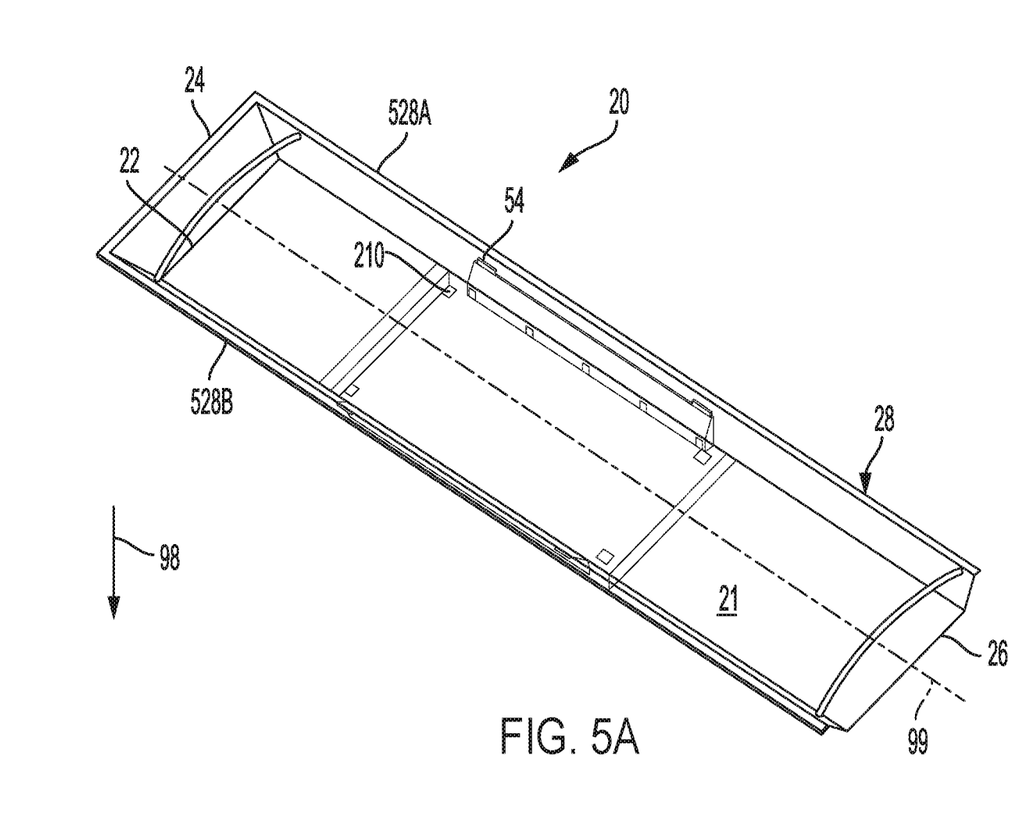
FIG. 5A shows one or more pry plates of the conveyor assembly.
Figure 5B:
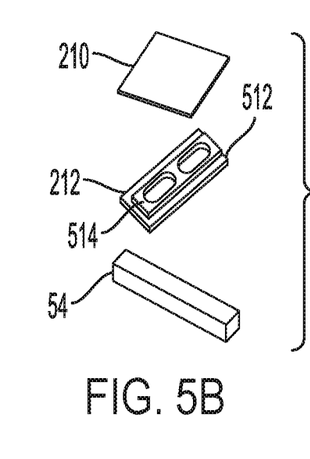
FIG. 5B shows a constraining lug and other elements aiding in the magnetic coupling.

FIG. 5A shows one or more pry plates being arranged between the conveyor pan and the drive carriage. The pry plates may be actuated to release the conveyor pan from the drive carriage. FIG. 5B illustrates a detailed view of the pry plate, constraining lugs, and magnetic steel lugs, each of which may enable the magnetic coupling between the conveyor pan and the drive carriage.

FIGS. 6A, 6B, 6C, 6D, and 6E show various views of the conveyor assembly. FIG. 7A shows a method for assembling the conveyor assembly. FIG. 7B shows a method for uncoupling the conveyor pan from the drive carriage.

FIGS. 1-6E show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a conveyor assembly 10. The conveyor assembly 10 may be configured to provide motion to a product. In one example, the conveyor assembly 10 is a vibration conveyor (e.g., a slip conveyor). Vibration conveyors may move in a first direction at a first acceleration and in a second direction at a second acceleration, wherein the first and second directions are opposite one another and the first acceleration is less than the second acceleration. Product arranged on the conveyor may move in the first direction as the conveyor oscillates between the first and second directions. It will be appreciated by those of ordinary skill in the art that the conveyor assembly may include other types of conveyors, for example, it may include tilting conveyors, sorting conveyors, rolling conveyors, cart on track conveyors, or the like without departing from the scope of the present disclosure.

Previous examples of slip conveyors or other similar conveyors rely on screws and/or bolts to fasten the conveyor to a drive carriage and/or a subframe. However, these screws and/or bolts experience a high amount of force as the slip conveyor oscillates, which may lead to degradation of the screws, the bolts, and/or other conveyor components. Degradation may include warping, cracking, or the like. If degradation occurs, a conveyor pan may experience degradation which may be more difficult to remove and expensive to fix and/or replace. For example, a through-hole which receives the screw or bolt may become misshapen, making it more difficult to loosen the screw or bolt. Even if the bolts and/or screws do not degrade, it may be time consuming for one or more operators to remove each of the bolts and/or screws prior to separating the conveyor pan from the drive carriage. Additionally or alternatively, fasteners that may become loose, such as bolts or screws, may enter the product arranged on the conveyor, which may be undesired. The conveyor assembly 10 solves the above identified problems as will be described herein.

An axis system 190 comprises three axes, namely an x-axis parallel to a horizontal direction, a y-axis parallel to a vertical direction, and a z-axis perpendicular to each of the x- and y-axes. A direction of gravity is shown by arrow 98 (herein, gravity 98). Gravity 98 is oriented in a direction parallel to the y-axis. A central axis 99 is shown via a dashed line.

As an example, conveyor assemblies, such as conveyor assembly 10, may experience accelerations of 6 G at a rate of 300 to 3600 cycles per minute (CPM). The differential motion of the conveyor may result in forward forces being half that of backward forces. As such, magnets may be difficult to incorporate into a slip conveyor assembly similar to the slip conveyor assembly 10 while still allowing a user to remove a conveyor pan relatively easily.

The conveyor assembly 10 may include at least a conveyor pan 20, a drive carriage 40, and a drive motor 60. The drive carriage 40 may be configured to couple to the conveyor pan 20 and the drive motor 60. In one example, the drive motor 60 produces a force, which is imparted onto the drive carriage 40. The drive carriage 40 may move in response to the force, the movement being transferred onto the conveyor pan 20. In the embodiment of FIG. 1, the conveyor pan 20 is transparent in order to reveal the drive carriage 40 and the drive motor 60, which would otherwise be occluded by the conveyor pan 20 in the present view.

The conveyor pan 20 may comprise a first end 22 about which the conveyor pan 20 may receive product to be conveyed. As such, the first end 22 may additionally be referred to as an inlet end 22. The first end 22 further comprises a first surface 24, where the first surface 24 extends in a direction angled to the central axis 99. In one example, the first surface 24 may be perpendicular to the central axis 99. In another example, the first surface 24 may form an angle greater than 90 degrees in relation to the central axis 99. The first surface 24 may be raised relative to a surface 21 of the conveyor pan 20 such that product may not leave the conveyor assembly 10 at the first end 22. In this way, the first surface 24 is shaped to maintain items on the conveyor pan 20.

The conveyor pan 20 extends from the first end 22 in a direction parallel to the central axis 99 toward a second end 26. Unlike the first end 22, the second end 26 does not comprise a surface such that items may freely leave the second end 26 when the conveyor pan 20 is actuated (e.g., oscillated). Side surfaces 28, which are parallel to one another and perpendicular to the first surface 24, extend from the first surface 24 to the second end 26 in the direction parallel to the central axis. The side surfaces 28 may be configured to block items from falling off the conveyor pan 20 until they reach the second end 26. In this way, the conveyor pan 20 may be constructed to transport items from the first end 22 to the second end 26 in a direction substantially parallel to the central axis 26.

The conveyor pan surface 21 may by physically coupled to each of the first surface 24 and the side surfaces 28. The physically coupling may include one or more of welds, fusions, adhesives, bolts, and the like. The conveyor pan surface 21 may face a direction opposite gravity 98 away from the ground. Thus, the conveyor pan surface 21 may be between the ground and product arrange on the conveyor pan surface 21. As such, the first surface 24 and the side surfaces 28 may define walls of the conveyor pan surface 21 and are shaped to block items from falling from the conveyor pan surface 21 so that items on the conveyor pan surface 21 are directed in the direction parallel to the central axis 99.

Forces between 1 to 10 G may be used to oscillate the conveyor pan 20. In some embodiments, 2 to 8 G may be used. In some embodiments, 4 to 7 G may be used. In one example, exactly 6 G is used. The conveyor pan 20 may be moved in a first direction 92 toward a second end 26 before being quickly reversed in a second direction 94 toward the first end 22. Oscillation between the first direction 92 and the second direction 94 may result in the overall conveyance of one or more items toward the second end 26. As mentioned above, the second end 26 may be free of walls or other features blocking items from leaving the conveyor pan surface 21. As such, the second end 26 may be an outlet.

The drive motor 60 may provide a motion and/or movement when activated (e.g., in an ON position where power may be consumed). The drive motor 60 may be electromagnetic, pneumatic, mechanical, servomotor, or the like. One or more components of the drive motor 60 may oscillate, which may be translated to the drive carriage 40, to which the drive motor 60 is coupled. Said another way, the drive motor 60 may be mounted to the drive carriage 40 and may provide motion to the drive carriage 40 when the drive motor 60 is activated. As such, the drive motor 60 does not directly actuate the conveyor pan 20. Mounting the drive motor 60 to the drive carriage 40 may include one or more fasteners (e.g., screws and/or bolts), welds, fusions, adhesives, or the like. The drive motor 60 may be mounted to a portion of the drive carriage 40 directly below the conveyor pan 20 so that the conveyor pan 20 may be removed from the drive carriage 40 without removal of the drive motor 60.

The drive carriage 40 may be coupled to the conveyor pan 20 via a plurality of magnets 50. In one example, there are exactly four magnets arranged at corners of the drive carriage 40 below the conveyor pan 20, however, other numbers of magnets may be used, for example, two, three, five, six, seven, eight, nine, and so on. The magnets 50 may apply a force to the conveyor pan 20 in a direction parallel to gravity 98. As such, the magnets 50 apply a force (e.g., magnetic coupling force 97) in a direction substantially perpendicular to a direction of conveyance and/or movement of items on the conveyor pan 20. Said another way, the magnets 50 apply force in a direction normal to the direction parallel to the central axis 99.

A magnetic coupling between the magnets 50 and the conveyor pan 20 may be such that the conveyor pan 20 is not misaligned with the magnets 50 as a result of its oscillation. As will be described in greater detail below, the conveyor pan 20 may comprise a plurality of magnetic plates which may align with the magnets 50. As such, the alignments between the plates and the magnets 50 may not be disrupted due to oscillation of one or more of the conveyor pan 20 or the drive carriage 40.

The drive carriage 40 may further comprise legs 42, which may be fastened to a surface (e.g., the ground). The legs 42 may function as supports and block the conveyor assembly 10 from moving along the ground. As such, the conveyor assembly 10 is stationary, despite comprising moving components. Said another way, the conveyor assembly 10 may be fixed to a location on the ground while the drive motor 60 promotes movement of various conveyor components (e.g., the drive carriage 40 and the conveyor pan 20).

Thus, the drive carriage 40 comprises a moveable portion which is coupled to each of the drive motor 60 and the conveyor pan 20, the drive carriage 40 further comprising legs 42 as an immovable portion. The drive motor 60 may be physically coupled to the moveable portion of the drive carriage 40 via fasteners (e.g., screws, bolts, welds, or the like) while the conveyor pan 20 may be magnetically coupled to the moveable portion of the drive carriage 40 via magnets 50. The magnetic coupling may allow for quick removal of the conveyor pan 20 relative to screws and/or bolts. Various mechanisms for initiating the decoupling of the conveyor pan 20 from the drive carriage 40 are described below.

Pry plates 54 may be used to move the conveyor pan 20 away from the magnets 50. As shown, the pry plates 54 are arranged closer to the side walls 28 than the magnets 50. A number of pry plates 54 may be equal to a number of magnets 50. Each pry plate of the pry plates 54 may be arranged proximally to a magnet of the magnets 50. In this way, a magnet may comprise a corresponding pry plate, wherein the corresponding pry plate may be actuated to loosen a magnetic coupling of the magnet to the conveyor pan 20.

A pry bar or other similar device may be inserted between a pry plate of the pry plates 54 and the drive carriage 40, wherein a pressure applied in a direction of gravity 98 against the pry bar may lift the conveyor pan 20 away from a corresponding magnet of the magnets 50 in a direction opposite and/or angled to gravity 98 and the magnetic coupling force 97. The pressure may be greater than a magnetic coupling force between the conveyor pan 20 and the magnets 50 of drive carriage 40 to lift the conveyor pan 20. In some embodiments, the magnetic coupling force of each magnet of the magnets 50 to the conveyor pan 20 may be between 10-200 lbs. In some embodiments, additionally or alternatively, the magnetic coupling force may be between 50-150 lbs. In some embodiments, additionally or alternatively, the magnetic coupling force may be between 80-120 lbs. In some embodiments, additionally or alternatively, the magnetic coupling force may be between 90-110 lbs. In some embodiments, additionally or alternatively, the magnetic coupling force may be between 95-105 lbs. A magnetic shield may then be placed between a magnet nearest the pry plate receiving the force and the conveyor pan 20 to prevent magnetic re-coupling from occurring as each of the remaining magnetic couplings are released.

In some embodiments, the conveyor assembly 10 may comprise a rotating element (e.g., a cam) which may rotate the conveyor pan 20 and disrupt the magnetic coupling between the conveyor pan 20 and the drive carriage 40. The cam may rotate the conveyor pan 20 about an axis parallel to the y-axis. In this way, the conveyor pan 20 may move from a position parallel to a length of the drive carriage 40 to a position perpendicular to the length of the drive carriage 40. Said another way, the conveyor pan 20 may be flipped about one of the side surface 28 via the rotating element.

Additionally or alternatively, the conveyor assembly 10 may comprise at least one lever, button, or the like which may be actuated to release the magnetic coupling. For example, a first lever may be arranged on a first side surface of the side surfaces 28 and a second lever may be arranged on a second side surface of the side surfaces 28. When the first lever is actuated, only the magnetic couplings nearest the first side surface of the side surfaces 28 may be disrupted. Thus, the magnetic couplings nearest the second of the side surfaces 28 may remain intact. Additionally or alternatively, the levers may be arranged about the first 22 and second 26 ends such that magnetic couplings nearest the ends may be adjusted (e.g., decoupled).

In some examples, additionally or alternatively, the conveyor assembly 10 may further comprise a support or the like for holding the conveyor pan 20 in place after one or more magnetic couplings have been disrupted (e.g., released). In this way, an operator may shift the conveyor pan 20 by disrupting some of the magnetic couplings, wherein the conveyor pan 20 may be held in the shifted position via the support. The shifted position may allow the operator to access the drive motor 60 and/or other components below the conveyor pan 20 without fully removing the conveyor pan 20 from the drive carriage 40. Thus, the operator may move the conveyor pan to the shifted position without assistance from a different operator and/or machine. After performing the desired tasks in the shifted position (e.g., repair and/or cleaning), the operator may return the conveyor pan 20 to a locked position, where the conveyor pan 20 is magnetically coupled to each of the magnets 50.

In some embodiments, additionally or alternatively, a hinge may be arranged at an infeed side of the conveyor assembly 10, wherein the infeed side is adjacent to the first surface 24. The magnets 50 may be arranged at the second end 26 adjacent to a discharge side of the conveyor assembly 10. As a result, the conveyor pan 20 may be actuated (e.g., pivoted about the hinge so that the second end 26 is raised relative to the position illustrated in FIG. 1) in an upward direction opposite gravity when desired, while the magnets may function to secure the conveyor pan 20 during its operation. Additionally or alternatively, the infeed side adjacent to the first surface 24 may comprise a rod configured to lift the conveyor pan 20. Lifting the conveyor pan may result in an angular decline relative to a starting position of the conveyor pan 20. As an example, when the conveyor pan 20 is not lifted, as shown in the example of FIG. 1, its angular decline may be 0 degrees. Once the conveyor pan 20 is lifted via one or more of the hinge and rod, its angular decline may increase to an angle between 10 to 60 degrees. The angular decline may result in the first surface 24 being vertically higher than the second end 26, thereby further promoting product to be displaced from the first surface 24 to the second end 26. The angular decline may be measured as an angle between the central axis 99 and the ground upon with the conveyor assembly 10 is arranged.

In this way, the slip conveyor assembly 10 of FIG. 1 comprises magnets 50 which may magnetically couple to an underside of the conveyor pan 20. In one example, the magnetic coupling may be directly to the pan. In other examples, such as in examples described in greater detail below, the conveyor pan 20 may comprise magnetic plates shaped to magnetically couple to the magnets 50. The magnetic coupling may impede misalignment of the conveyor pan 20 with the drive carriage 40. That is to say, while the slip conveyor assembly 10 may be accelerated in directions perpendicular to a direction of the magnetic coupling (s), the conveyor pan 20 may not be displaced from a starting position prior to activation of the drive motor 60. As such, the starting position may be a fixed, unchanged position, wherein the drive motor 60 actuates the drive carriage 40 and the conveyor pan 20 in first and second directions, wherein the magnets 50 and the corresponding magnetic couplings promote substantially identical movement of the drive carriage 40 and the conveyor pan 20. In this way, the conveyor pan 20 may be removed from the drive carriage 40 only via an actuation of the conveyor pan 20 in a direction perpendicular to each of the first and second directions via the pry plates 54. As shown in FIG. 1, the magnets 50 may be occluded from view when the conveyor assembly 10 is assembled. However, the pry plates 54 may be arranged on an exterior of the conveyor pan 20 so that the magnetic coupling of the magnets 50 to the conveyor pan 20 may be disrupted.

In some examples, additionally or alternatively, the conveyor pan 20 may oriented to convey a product at an angle relative to a ground upon which the conveyor assembly 10 is arranged. In such an example, the magnetic coupling force 97 may be substantially perpendicular to a direction of movement of the product while being angled to the direction of gravity 98. In one example, the magnetic coupling force 97 may be acutely or obtusely angled to the direction of gravity 98 when the product is conveyed at the angle relative to the ground. For example, the conveyor pan 20 may be oriented at an acute angle relative to the ground, wherein the angle may be ±10 degrees, wherein a positive angle may correspond to an incline and a negative angle may correspond to a decline. In some examples, additionally or alternatively, the angle may be between ±3-5 degrees. Additionally or alternatively, the angle may be between +30 degrees. The angle may be measured relative to an angle generated between the central axis 99 and the ground upon which the conveyor assembly 10 is arranged. Additionally or alternatively, a positioning of the magnets 50 may remain at the corners where of the drive carriage 40. In some examples, additionally or alternatively, the positioning of the magnets 50 may be adjusted to be biased toward the first end 22 or the second end 24. Additionally or alternatively, a number of magnets may be increased or decreased in response to the conveyor pan 20 being angled to the ground.

Turning now to FIG. 2A, it shows an exploded view 200 of the conveyor assembly 10. In the exploded view 200, the drive motor (e.g., drive motor 60 of FIG. 1) is not included for reasons of brevity. As such, components previously introduced may be similarly number in subsequent figures.

As shown, the conveyor pan 20 rests above the drive carriage 40 such that the drive carriage 40 is between the ground and the conveyor pan 20. In one example, the drive carriage 40 is coupled to a portion of the conveyor pan 20 exactly between the first 22 and second 26 ends.

The conveyor pan 20 comprises a plurality of magnetic plates 210 physically coupled to an underside of the conveyor pan surface 21. That is to say, the magnetic plates 210 do not come into contact with product being conveyed on the conveyor pan 20. The magnetic plates 210 may be physically coupled to the conveyor pan 20 via one or more of welds, screws, fusions, adhesives, and the like. The magnetic plates 210 directly align with and are pressed against the magnets 50 when the conveyor assembly 10 is in a fully assembled position, as shown in FIG. 2B. A number of magnetic plates 210 is identical to a number of magnets 50. The magnetic plates 210 may comprise magnetic steel or the like. In one example, the magnets 50 and the magnetic plates 210 may be in face-sharing contact when magnetically coupled to one another, which may result in the conveyor pan 20 being physically coupled to the drive carriage 40. In this way, the magnets 50 may directly physically couple to the magnetic plates 210 and not to the underside of the conveyor pan 20. The magnets 50 may prevent movement of the conveyor pan 20 in a direction normal to or angled to gravity 98.

The conveyor pan 20 may further comprise constraining lugs 212. A number of constraining lugs 212 may be identical to a number of receiving holes 214, wherein the receiving holes 214 are arranged on the drive carriage 40 and are configured to receive the constraining lugs 212 when the magnets 50 and the magnetic steel plates 210 are fully aligned. When the constraining lugs 212 are inserted into and fully received by the receiving holes 214, the constraining lugs 212 may function to block a misalignment between the conveyor pan 20 and the drive carriage 40. That is to say, the constraining lugs 212 may block misalignment of the conveyor pan 20 and the drive carriage 40 in a direction perpendicular to gravity 98. In this way, the magnets 50 and the magnetic plates 210 may provide a force parallel to gravity 98, while the constraining lugs 212 and the receiving holes 214 provide a force perpendicular to gravity 98. These opposing forces may work in tandem to maintain the conveyor pan 20 in the fully assembled position (e.g., the position shown in FIG. 2B) throughout an entirety of the operation of the conveyor assembly 10. In some examples, the constraining lugs 212 may offset forces of sheer between the drive carriage 40 and the conveyor pan 20. By arranging the magnets and the constraining lugs in this way, the magnetic forces may be reduced such that the conveyor pan 20 may be removed more easily than if only magnets were incorporated. That is to say, the magnetic forces of the magnets 50 may be reduced due to the utilization of the constraining lugs 212 such that the conveyor pan 20 is not dislodged during operation of the conveyor assembly 10, but may be selectively removed by a user via a release mechanism more easily compared to if constraining lugs were omitted.

The pry plates 54 may be arranged on surfaces parallel and outside of the side surfaces 28 such that the pry plates 54 do not come in contact with items being conveyed on the conveyor pan 20. A release mechanism (e.g., pry bar, levers, cam, and the like described above with respect to FIG. 1) may press against the pry plates 54, wherein the pressing may overcome a magnetic force of the magnets 50 to disrupt the magnetic coupling between the magnets 50 and the magnetic plates 210 to uncouple the conveyor pan 20 from the drive carriage 40.

The constraining lugs 212 may be arranged between adjacent pry plates 54 parallel to side walls (e.g., side walls 28 of FIG. 1) of the conveyor pan 20. As such, the receiving holes 214 may be arranged between the magnets 50 on the drive carriage 40. A number of constraining lugs 212 may be greater than a number of magnets 50 and pry plates 54.

Turning now to FIG. 2B, it shows a fully assembled position 250 of the conveyor assembly 10. The fully assembled position 250 may be substantially similar to the fully assembled position 200 shown in FIG. 1, except that the fully assembled position 250 does not illustrate the drive motor 60. In the fully assembled position, the conveyor pan 20 is fully engaged and/or fully locked with the drive carriage 40. The engagement between the conveyor pan 20 and the drive carriage 40 may not be adjusted due to products being conveyed on the conveyor pan 20 and/or due to locomotion of the conveyor pan 20. Thus, the engagement may only be adjusted in response to an external force applied to one of the release mechanisms previously described. In this way, only the constraining lugs 212 and the magnets 50 may be used to physically couple the conveyor pan 20 to the drive carriage 40.

Turning now to FIG. 3A, it shows a detailed view of an embodiment 300 of the drive carriage 40 and the drive motor 60. As described above, the drive motor 60 may be mounted to the drive carriage 40 via a plurality of fasteners. The fasteners may only couple the drive motor 60 to the drive carriage 40 and do not interact with a conveyor pan (e.g., conveyor pan 20 of FIG. 1). The drive motor 60 may be physically coupled to a portion of the drive carriage 40 between each of the legs 42. The drive motor 60 may be spaced away from the conveyor pan when the conveyor pan is fully locked with the drive carriage 40 (as shown in FIGS. 1 and 2B) so that the drive motor 60 does not touch the conveyor pan.

FIG. 3B shows an embodiment 325 of the drive carriage 40 with the magnets 50 removed. Cutouts 310 of the drive carriage are illustrated, wherein the cutouts 310 expose the magnets 50 arranged therebelow, as shown in FIG. 3A. The cutouts 310 may be shaped similarly to a shape of the magnets 50. Additionally or alternatively, a size of the cutouts 310 may be equal to or less than a size of the magnets 50. In one example, the cutouts 310 are smaller than the magnets 50. In one embodiment, the cutouts 310 and the magnets 50 are square. In some examples, the cutouts 310 may comprise a length less than 5 inches and the magnets 50 may comprise a length less than 7 inches. In some examples, additionally or alternatively, the cutouts 310 may comprise length less than 4 inches and the magnets 50 may comprise a length less than 6 inches. In some examples, additionally or alternatively, the cutouts 310 may comprise length less than 3 inches and the magnets 50 may comprise a length less than 4 inches. In some examples, additionally or alternatively, the cutouts 310 may comprise length less than 2 inches and the magnets 50 may comprise a length less than 3 inches. In one example, the cutouts 310 comprise a length of 1.8 inches and the magnets 50 comprise a length of 2 inches. Dimensions of the cutouts 210 and the magnets 50 may be adjusted without departing from the scope of the present disclosure.

Returning to FIG. 3A, the magnets 50 may be arranged within magnet housings 302 arranged directly below the cutouts 310 of the drive carriage. The magnets 50 and the magnet housings 302 may be symmetrically arranged about the drive carriage 40. In some examples, the orientation and/or number of magnets may be adjusted to adjust a coupling of the conveyor pan to the drive carriage 40. For example, more magnets may be added if a force applied to the conveyor pan is higher and/or if a weight of the conveyor pan is higher.

Turning now to FIG. 3C, a magnet housing 350 of the magnet housings (e.g., magnet housing 302 of FIG. 3A) is shown. The magnet housing 350 is transparently illustrated to depict the magnet 50 and other interior components of the magnet housing 350. The magnet housing 350 may comprise a spacer 352 and a plurality of through-holes 354.

The spacer 352 may be arranged between a cutout of the cutouts 310 and the housing 350. The spacer 352 may adjust a magnetic force applied from the magnet 50 to a magnetic plate (e.g., magnetic plate 210 of FIG. 2A). Specifically, the spacer 352 may decrease the magnetic force applied by the magnet 50 to the magnetic plate in proportion to its thickness. Thus, if the thickness of the spacer 352 increases, then the magnetic force applied by the magnet 50 to the magnetic plate decreases. In this way, the magnetic coupling between the conveyor pan and the drive carriage may be adjusted via the spacer 352 of the magnet housing 350.

The through-holes 354 may be configured to receive a fastener such that the housing 350 may be mounted to the drive carriage 40. In some embodiments, the through-holes 354 are threaded and configured to mate with a screw. In some embodiments, additionally or alternatively, the through-holes 354 may be partially threaded and partially smooth and configured to receive a similarly threaded and smooth screw. In some embodiments, additionally or alternatively, the through-holes 354 may be completely smooth and configured to receive a bolt. The through-holes 354 may extend through the spacer 352 and align with similar through-holes 354 of the drive carriage 40.

Arranged below the magnet 50 relative to gravity there is a magnetic enhancer 356. The magnetic enhancer 356 is a magnetic steel plate, in one example. The magnetic enhancer 356 may increase a magnetic coupling force between the magnet 50 and the magnetic plate of the conveyor pan. Thus, by adjusting one or more of the magnetic enhancer and the spacer 352, the magnetic coupling force may be optimized to a desired magnetic coupling force value. In one example, optimizing the desired magnetic coupling force value may be based on a magnetic force strong enough to hold the conveyor pan 20 to the drive carriage 40 when the drive mechanism 60 is activated while allowing a user to easily release a single magnetic coupling. As such, if the desired magnetic coupling force value is relatively high, then it may be desired to use more magnets to couple the conveyor pan 20 to the drive carriage 40 so that an individual magnetic coupling is simple to release while the magnets may collectively hold the conveyor pan 20 against the drive carriage 40.

The magnetic enhancer 356 may be shaped similarly to the magnet 50. In one example, each of the magnetic enhancer 356, the magnet 50, and the cutouts 310 are square. It will be appreciated that other shapes, such as circular, triangular, rectangular, and the like may be used without departing from the scope of the present disclosure.

Thus, the magnet housing 350 may be cube-shaped with an interior space configured to hold the magnetic enhancer 356 below the magnet 50. The spacer 352 may be arranged above the magnet 50. The spacer 352 may be pressed closed and in face-sharing contact with surfaces of the magnet housing 350 via fasteners passing through the through-holes 354. The through-holes 354 may be symmetrically arranged about each corner of the magnet housing 350.

Turning now to FIG. 4A, it shows a view 400 of the drive carriage 40 illustrating the receiving holes 214 in greater detail. As shown, the receiving holes 214 may be arranged along a side surface of the drive carriage 40. As described above, the receiving holes 214 may be configured to receive constraining lugs (e.g., constraining lugs 212 of FIG. 2A). The constraining holes 214 may be shaped such that they may allow the constraining lugs to move in a direction parallel to gravity 98. In one example, additionally or alternatively, the holes 214 may be shaped to block movement of the constraining lugs in a direction perpendicular to gravity 98.

Turning now to FIG. 4B, it shows an exploded view 450 of a magnetic housing 460. The magnet housing 460 may be substantially identical to the magnet housing 350, except that a number of through holes 464 of the magnet housing 460 is less than a number of through-holes 364 of the magnet housing 350. Specifically, the magnet housing 460 comprises exactly two through-holes 464 and the magnet housing 350 comprises exactly four through-holes 364. Spacer 462 and magnet enhancer 466 may be used similarly to the spacer 362 and magnet enhancer 366.

Turning now to FIGS. 5A and 5B, the figures show detailed views of the conveyor pan 20, the magnetic plate 210, the constraining lug 212, and the pry plates 54. FIGS. 5A and 5B are described in tandem.

The side surfaces 28 are shown having a first angled side surface 528A and a second angled side surface 528B. The first side surface 528A and the second side surface 528B may be angled to promote motion of the conveyor pan 20 in a direction perpendicular to gravity 98 and parallel to the central axis 99. The first 528A and second 528B side surfaces may extend away from the central axis 99 and may be angled greater than perpendicular relative to the conveyor pan surface 21. Additionally or alternatively, the first side surface 528A and the second side surface 528B may be perpendicular to the conveyor pan surface 21. Additionally, by angling the first side surface 528A and the second side surface 528B, the volume of items which the conveyor pan surface 21 may hold is increased.

The pry plates 54 may be physically coupled to outer surfaces of the first side surface 528A and the second side surface 528B. Specifically, two of the pry plates 54 are coupled to the first side surface 528A and two of the pry plates 54 are coupled to the second side surface 528B. An operator may utilize the pry plates 54 to apply a force to the conveyor pan 20 to release the magnetic coupling force between the conveyor pan 20 and the drive carriage (e.g., drive carriage 40 of FIG. 1). For example, the conveyor pan 20 may move up in a direction opposite gravity 98. As another example, the conveyor pan 20 may rotate about an axis parallel to gravity 98, as described above.

The magnetic plate 210 may be substantially square shaped. The magnetic plate 210 may be shaped similarly to the magnets (e.g., magnets 50 of FIG. 4B) in some examples. Surfaces of the magnetic plate 210 may be smooth such that the magnetic plate 210 may minimally protrude from the underbody of the conveyor pan surface 21. As shown, there may be a plurality of the magnetic plate 210. In one example, the plurality comprises four magnetic plates, each magnetic plate being substantially identical.

Additionally or alternatively, each of the pry plates 54 may be arranged adjacent to each magnetic plate 210. As shown, there may be four magnetic plates. The magnetic plates may be physically coupled to inner surfaces of the first surface 528A and the second surface 528B in one example, while the pry plates 54 are physically coupled to outer surfaces of the first surface 528A and the second surface 528B opposite the magnetic plates.

The pry plates 54 may be shaped similarly to a rectangular prism. However, other shapes may be used, such as cubical. The pry plates 54 may be physically coupled to outer surfaces of the first 528A and second 528B surfaces via one or more of welds, fusions, adhesives, fasteners, and the like. In some examples, the pry plates 54 may provide a gap between the first 528A and second 528B side surfaces and the drive carriage, wherein the gap is large enough to receive a pry bar for an operator to actuate and weaken the magnetic coupling force between the conveyor pan 20 and the drive carriage.

The constraining lugs 212 each comprise a flat surface 512 and a protrusion 514. A receiving hole of the receiving holes (e.g., receiving holes 214 of FIG. 2A) may receive the protrusion 514 in such a way that the constraining lugs 212 may not disengage with the receiving hole during motion of the conveyor pan 20.

Figure 6A:
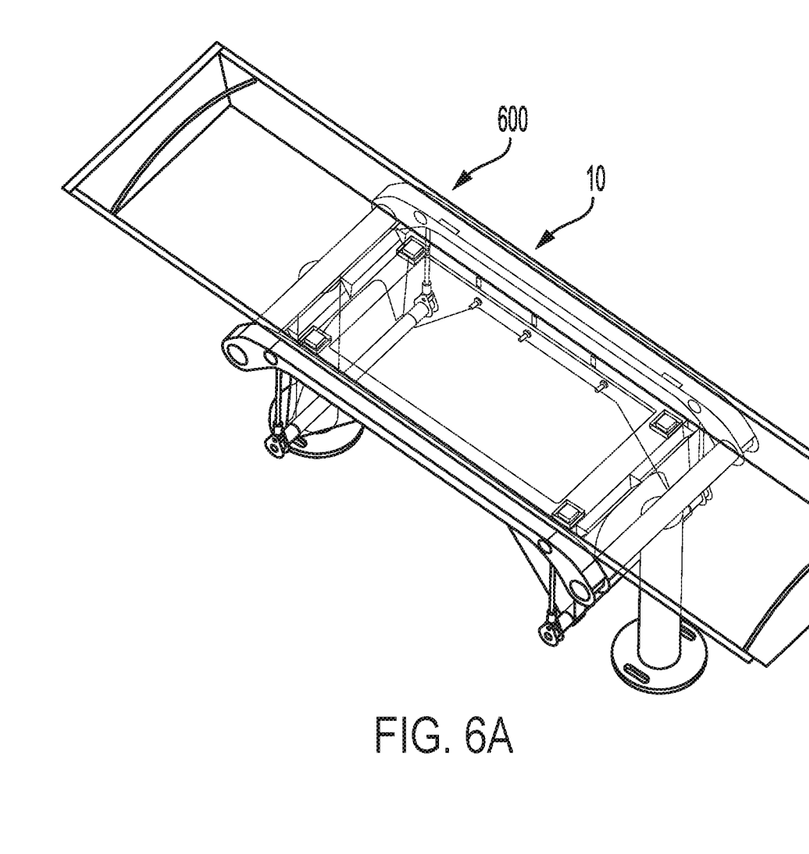
FIGS. 6A, 6B, 6C, 6D, and 6E show various views of the conveyor assembly.
Figure 6B:
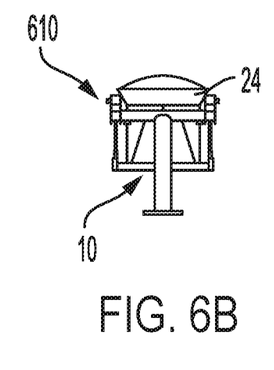
Figure 6C:
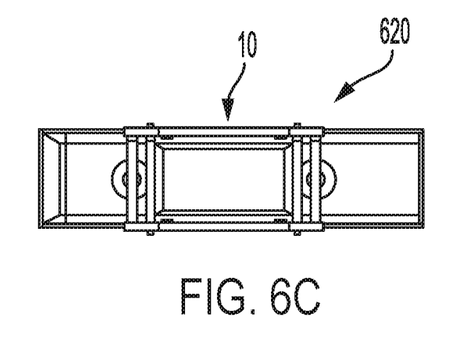
Figure 6D:
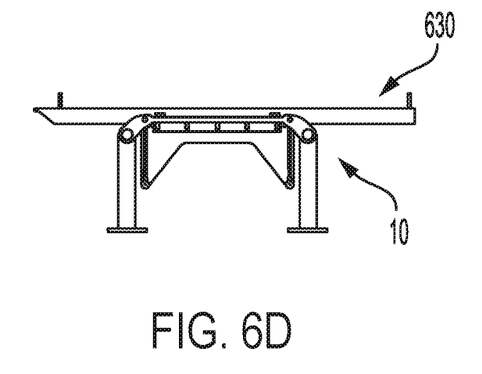
Figure 6E:
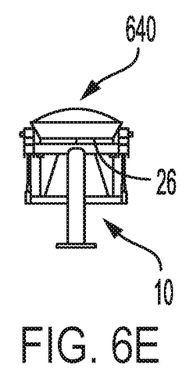
Figure 7A:
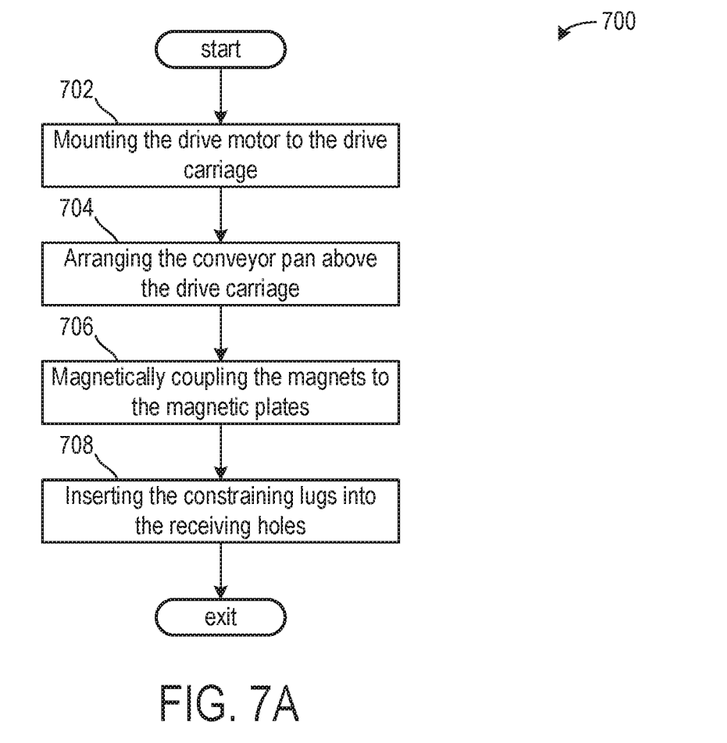
FIG. 7A shows a method for assembling the conveyor assembly.
Figure 7B:
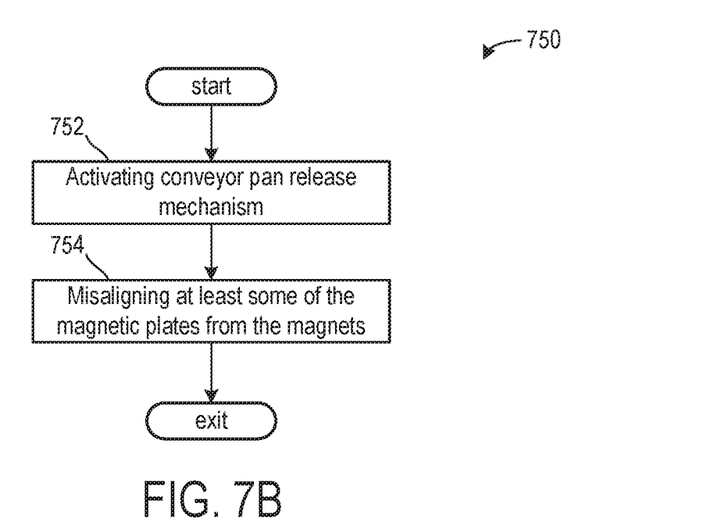
FIG. 7B shows a method for disassembling the conveyor pan from the drive carriage.

FIGS. 6A, 6B, 6C, 6D, and 6E show various view of the conveyor assembly 10. FIG. 6A shows an isometric view 600 of the conveyor assembly 10. FIG. 6B shows a face-on view 610 of the conveyor assembly 10 with the first surface 24 being nearest to a viewer. FIG. 6C shows a top-down view 620 of the conveyor assembly 10. FIG. 6D shows a side-on view 630 of the conveyor assembly 10. FIG. 6E shows a face-on view 640 of the conveyor assembly 10 with the second end 26 being nearest to the viewer.

Turning now to FIG. 7A, it shows a method 700 for assembling a conveyor assembly (e.g., conveyor assembly 10 of FIG. 1).

The method 700 begins at 702 where the method may include mounting the drive motor to the drive carriage (e.g., drive motor 60 and drive carriage 40 of FIG. 1). The mounting may include fastening the drive motor to a moveable portion of the drive carriage. In this way, the drive motor may transfer its motion to the drive carriage, which in turn may actuate a conveyor pan (e.g., conveyor pan 20 of FIG. 1).

The method 700 may proceed to 704, where the method 700 may include arranging the conveyor pan above the drive carriage. The arranging may include aligning the magnetic plates of the conveyor pan with the magnets of the drive carriage. Additionally or alternatively, the constraining lugs may be aligned with the receiving holes.

The method 700 may proceed to 706, where the method may include magnetically coupling the magnets to the magnetic plates.

The method 700 may proceed to 708, where the method may include inserting and/or sliding the constraining lugs into the receiving holes. In some examples, 706 and 708 of method 700 may occur simultaneously. Once the magnets have been coupled and the lugs have been inserted into the receiving holes, the conveyor pan may not be released from the drive carriage unless a release mechanism is actuated, as will be described below with respect to FIG. 7B.

Turning now to FIG. 7B, it shows a method 750 for uncoupling and/or releasing the conveyor pan from the drive carriage. The releasing may include breaking a magnetic coupling between at least one of the magnets and magnetic plates. Breaking the magnetic coupling of fewer than all of the magnets and the magnetic plates may be referred to herein as a partially unlocked position. Thus, a fully unlocked position may include each of the magnets and magnetic plates being uncoupled such that the conveyor pan may be completely removed from the drive carriage.

The method 750 begins at 752, where the method 700 may include activating a conveyor pan release mechanism. As described above, the release mechanism may include one or more of a cam, pry bar, lever, button, or the like. The release mechanism may be activated in response to a demand to clean, service, and/or repair one or more conveyor components.

The method 750 may proceed to 754, where the method 750 may include misaligning at least some of the magnetic plates from the magnets. The misaligning may include rotating and/or lifting the conveyor pan such that the at least some magnetic plates and magnets are no longer completely overlapping. By misaligning at least some of the magnetic plates from the magnets, the conveyor pan may be moved from the fully locked position to the partially unlocked position.

If it is desired to move the conveyor pan from the fully locked position to the fully unlocked position, then all of the magnetic plates may be misaligned with the magnets. As an example, the fully unlocked position may include fully actuating the release mechanism. That is to say, to partially unlock the conveyor pan, the release mechanism may be actuated to a half-way point, while to fully unlock the conveyor pan the release mechanism may be completely actuated to a position past the half-way point.

In this way, a conveyor assembly may magnetically couple a conveyor pan to a drive carriage. A drive motor may be physically coupled the drive carriage below the conveyor pan. The drive motor may actuate the drive carriage, which, in response, may actuate the conveyor pan. The technical effect of magnetically coupling the conveyor assembly to the drive carriage is to allow quick removal and easy access to the conveyor pan and components arranged below the conveyor pan.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A conveyor system, comprising:
a drive carriage comprising a plurality of magnets spaced away from a drive motor, wherein the drive carriage is configured to translate motion from the drive motor to a conveyor pan to convey items arranged on a conveyor pan surface, and wherein the plurality of magnets applies a force to the conveyor pan in a direction perpendicular to a direction of movement of the conveyor pan.

2. The conveyor system of claim 1, wherein the drive motor is mounted to the drive carriage.

3. The conveyor system of claim 1, wherein the drive carriage is fixed to a ground, and wherein the conveyor pan surface faces a direction away from the ground angled relative to gravity.

4. The conveyor system of claim 1, wherein the plurality of magnets is arranged about corners of the drive carriage, wherein the conveyor pan comprises magnetic plates physically coupled to an underside of the conveyor pan surface, and wherein the magnetic plates are configured to magnetically couple to the plurality of magnets.

5. The conveyor system of claim 4, wherein the conveyor pan comprises pry plates arranged adjacent to the magnetic plates along and exterior to a side wall of the conveyor pan, and wherein the pry plates are configured to release the conveyor pan from the drive carriage in response to a pressure.

6. The conveyor system of claim 5, wherein the pressure is greater than a magnetic coupling force between the plurality of magnets and the conveyor pan.

7. The conveyor system of claim 1, wherein the conveyor system is a slip conveyor system, wherein the motion comprises a first force in a first direction and a second force in a second direction, wherein the second direction is opposite the first direction and the second force is greater than the first force, and wherein items are conveyed in the first direction.

8. A method comprising:
mounting a drive motor to a drive carriage;
arranging a conveyor pan above the drive carriage; and
coupling the conveyor pan to the drive carriage magnetically via magnetic plates of the conveyor pan and magnets of the drive carriage.

9. The method of claim 8, wherein the coupling further includes inserting each of a plurality of constraining lugs of the conveyor pan into each of a plurality of receiving holes of the drive carriage.

10. The method of claim 8, wherein the magnets and the magnetic plates comprise a magnetic coupling force extending in a direction parallel to gravity.

11. The method of claim 10, further comprising activating the drive motor to actuate the drive carriage and conveyor pan in a first direction and a second direction, wherein the first direction is opposite the second direction, and wherein each of the first and second directions is perpendicular to the magnetic coupling force and the direction parallel to gravity.

12. The method of claim 8, further comprising releasing the conveyor pan from the drive carriage, wherein the releasing comprises applying a force in a direction parallel to gravity to overcome a force of a coupling between a magnetic plate of the magnetic plates and a magnet of the magnets.

13. A slip conveyor assembly comprising:
a drive carriage comprising a moveable portion and a fixed portion, the fixed portion comprising legs physically coupled to a ground on which the slip conveyor assembly is arranged, wherein the moveable portion is physically coupled to a drive motor, the drive motor configured to actuate the drive carriage in a first direction and a second direction opposite the first direction; and
a conveyor pan physically coupled to the moveable portion of the drive carriage via aligning a plurality of magnetic plates of the conveyor pan to a plurality of magnets of the drive carriage.

14. The slip conveyor assembly of claim 13, wherein each magnet of the plurality of magnets is arranged in a magnetic housing, wherein the magnetic housing comprises a spacer and a magnetic enhancer, and wherein each magnet is arranged between the spacer and the magnetic enhancer within the magnetic housing.

15. The slip conveyor assembly of claim 14, wherein the spacer is configured to adjust a magnetic force, and wherein the spacer is thickened to decrease the magnetic force.

16. The slip conveyor assembly of claim 14, wherein the spacer is arranged between each magnet and a corresponding magnetic plate of the plurality of magnetic plates.

17. The slip conveyor assembly of claim 14, wherein a number of magnetic plates, a number of magnets, a number of spacers, and a number of magnetic enhancers is equal.

18. The slip conveyor assembly of claim 13, wherein the plurality of magnets and the plurality of magnetic plates are attracted via a magnetic force extending in a direction parallel to gravity, wherein the direction parallel to gravity is normal to the first direction and the second direction about which the conveyor pan actuates, wherein the conveyor pan actuates in the first direction at a first acceleration and in the second direction at a second acceleration, and wherein the second acceleration is greater than the first acceleration.

19. The slip conveyor assembly of claim 13, wherein the conveyor pan further comprises constraining lugs, wherein the constraining lugs are received by receiving holes arranged on the drive carriage, and wherein the constraining lugs block a movement of the conveyor pan in a third direction perpendicular to each of the first direction, the second direction, and a direction of gravity.

20. The slip conveyor assembly of claim 13, wherein the conveyor pan further comprises a plurality of pry plates, and wherein each pry plate is arranged adjacent to a magnet of the plurality of magnets.

\* \* \* \* \*